Jan. 26, 1971     D. LEJEUNE     3,558,383

RETREADING OF TIRE COVERS

Filed July 15, 1968

INVENTOR.
DANIEL LEJEUNE

BY

Brumbaugh, Graves, Donohue & Raymond his     ATTORNEYS

United States Patent Office 3,558,383
Patented Jan. 26, 1971

3,558,383
RETREADING OF TIRE COVERS
Daniel Lejeune, Clermont-Ferrand, France, assignor to Compagnie Generale des Etablissements Michelin, raison sociale Michelin & Cie, Clermont-Ferrand, France
Filed July 15, 1968, Ser. No. 744,956
Claims priority, application France, July 20, 1967, 115,077
Int. Cl. B29h 5/04, 19/00
U.S. Cl. 156—96                    9 Claims

ABSTRACT OF THE DISCLOSURE

A tire is retreaded by applying bands of tread material in rings circumferentially of the carcass, then rotating the tire while subjecting the positioned bands to a uniform rolling pressure of at least .5 kg./cm.$^2$, and finally vulcanizing the assembly.

BACKGROUND OF THE INVENTION

The present invention relates to the retreading of tire covers, especially tire covers of large size used on trucks or public works equipment, the treads of which are formed of massive blocks or bars. More particularly, the invention relates to improvements of the methods of retreading comprising positioning on and bonding to a carcass a plurality of elements the total of which reconstitutes a molded tread and to tire covers retreaded by the method.

A conventional method of retreading tire covers of the kind used on public works machinery and vehicles of the heavy duty type comprises forming blocks or bars by means of shaped rubber elements of suitable cross section, placing these blocks or bars individually on a carcass prepared in advance giving them the same direction as in the original cover, and finally baking the tire in an autoclave.

This method offers the advantage of avoiding the use of vulcanizing molds, which are especially cumbersome for large-size tires having treads formed with deep and wide moldings. However, it has the disadvantage of requiring delicate work and of not always giving satisfactory results. Indeed, this method requires that each rubber element and each of the strips serving for protection against the infiltration of steam into the junction lines of the various rubbers during vulcanization be applied separately and by hand. Further, it requires that the elements be positioned on the carcass manually, for example with the help of rollers. This method requires a constant effort on the part of the worker, who must exert high pressure in order to obtain good adherence. Experience has shown that the pressure exerted by a worker does not exceed an average of 200 or 300 g./cm.$^2$, which is insufficient. Frequently the rubber pieces to be added are made to adhere by hitting them with a mallet, but such practice sometimes results in inadvertent dislocation of a previously adhered piece. As may be seen, the quality of retreading by this method is bound up with the efficiency of the worker and depends upon the care he applies to the operation. The effectiveness of the method leaves much to be desired in the further respect that, in the absence of a mutual support of the various elements, their only surface of attachment does not enable them to resist the wrenching force exerted during the aforementioned rolling.

SUMMARY OF THE INVENTION

An object of the present invention is to remedy these disadvantages of the known methods and to provide a method of retreading which lends itself to mechanization, which assures a firm bond of the new tread rubber elements to a carcass to be retreaded, and which facilitates production of a retreaded tire having good road-holding ability both in crosswise and longitudinal directions and good resistance to wear and tear.

The method of retreading in accordance with the invention comprises mounting a tire carcass, positioning a plurality of bands of tread material in rings extending cirrcumferentially of the carcass, the rings being at axially different locations on the carcass, subjecting the bands to a circumferential rolling under a uniform pressure of at least .5 kg./cm.$^2$, positioning masking means between adjacent bands to seal off the carcass between the bands, and vulcanizing the assembly, whereby the bands form a new tread for the tire.

By mounting the bands longitudinally or circumferentially, it becomes possible to undertake mechanically and semiautomatically the various operations of laying-down and fixing of the retreading elements to be added to the carcass as well as of the masking means. The mounting of the longitudinal bands on the carcass can be facilitated, for example, by rotating the carcass. Moreover, the bands can be made to adhere to the carcass by rotating the carcass and forcing a roller against them, using one of the known devices employed, for example, for retreading tire covers to be vulcanized in a mold.

The circumferential continuity of the elements applied and their mounting and fixing by mechanical means of uniform effectiveness provide an assembly on the carcass which is solid and durable.

Preferably, the profiled bands are put in place in crude condition and grooves of the bands are given shape, likewise in crude condition, either before or, preferably, after the bands are put in place. However, it is possible to use profiled and grooved bands which have been partly or fully vulcanized in advance. Furthermore, bands can be used which have been cut into sections in advance so as to form rings which may be either crude or vulcanized.

Preferably, one uses bands with a trapezoidal cross section. The bands, which are placed next to each other at axially different locations on the carcass to form the tread, may be applied in any number whatever. However, it is prefered that the number of bands applied range from 3 to 5. The various bands used on one cover may but need not have the same transverse and circumferential profile. For example, one may use a comparatively wide center band and comparatively narrow side bands. The various longitudinally or circumferentially arranged bands can be placed so as to join each other or to have intervals between them in the transverse or axial direction, depending on the relationship of lands and grooves one wishes to obtain. It is also possible to provide grooves of variable width as a function of location on the circumference.

Towards such end, it suffices for the bands to have cross sections the width of which is variable, with a given pitch, and to place the bands in a manner, for example, whereby the zones of maximum width and the zones of minimum width of adjacent bands coincide. Inasmuch as the different rubber blocks arranged one after the other in the circumferential direction originate from the same longitudinal band, which firmly adheres to the carcass underneath along its entire surface and is partly cut out in order to form the separate blocks, such blocks are better able to withstand wrenching forces, principally in the circumferential direction.

BRIEF DESCRIPTION OF THE DRAWINGS

An understanding of additional aspects of the invention may be gained from a consideration of the following detailed description of several representative embodiments thereof, taken in conjunction with the appended figures of the drawing, in which.

DESCRIPTION OF THE PREFERRED EMBODIMENTS

Figure 1:
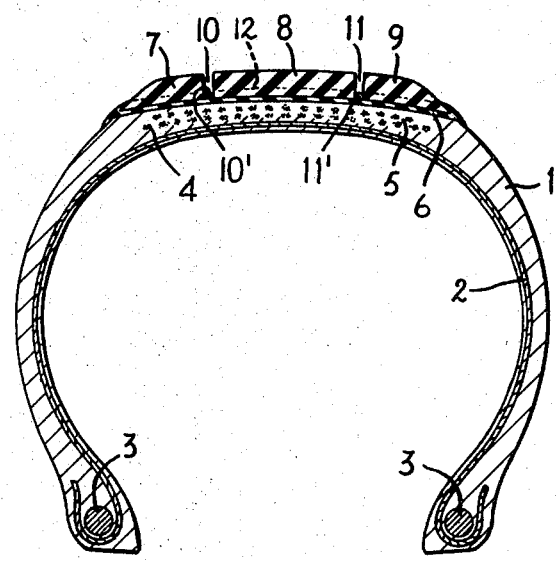
FIG. 1 is an axial cross section of a tire carcass mounting longitudinal bands the aggregate of which forms a new tread for the tire in accordance with the invention.

In FIG. 1, 1 is the carcass of a tire salvaged from a cover the tread of which has in part worn off and in remainder been deliberately removed in preparation for the retreading operation. This carcass comprises a reinforcement of cords 2 rolled around two heavy bead wires 3, and two crown plies 4 and 5. Over this carcass has been placed a connective layer 6 comprising one or more preferably unvulcanized sheets of rubber. On the layer 6 three ring-shaped bands 7, 8 and 9 have been arranged longitudinally (or circumferentially), fully encircling the cover 1. The transverse (or axial) profile of the bands 7 and 9 is identical, these bands being mounted so that one is a mirror image of the other while the profile of the center band 8 is different and wider. Between the three bands two spaces 10 and 11 have been provided, which form two circumferential grooves. Masking means 10' and 11' are placed in these grooves, respectively, to seal off the portions of the carcass, including the layer 6, between the bands 7 and 8, and 8 and 9. This prevents infiltration of steam during vulcanization in an autoclave.

Figure 2:
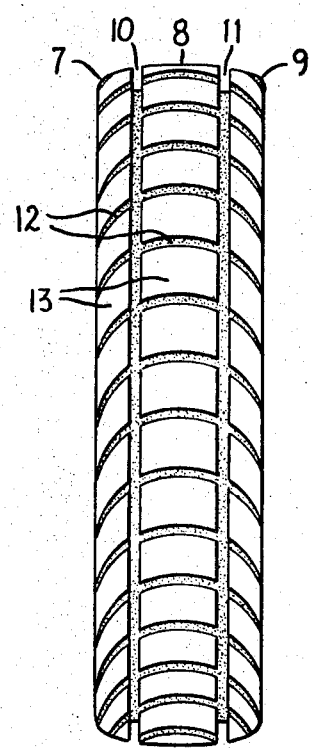
FIG. 2 is a plan view of the tread of the retreaded tire shown in FIG. 1 after the forming of the transverse grooves.

FIG. 2 shows that after the crude rubber bands 7, 8, 9 have been put in place, transverse grooves 12 in the shape of the arc of a circle are provided at regular intervals by means of a hollow chisel, the transverse grooves having a depth equalling, for example, ¾ of the thickness of the bands. In this manner one obtains a tread consisting of blocks 13 which are separated by the circumferential grooves 10 and 11 and the transverse grooves 12.

Figure 4:
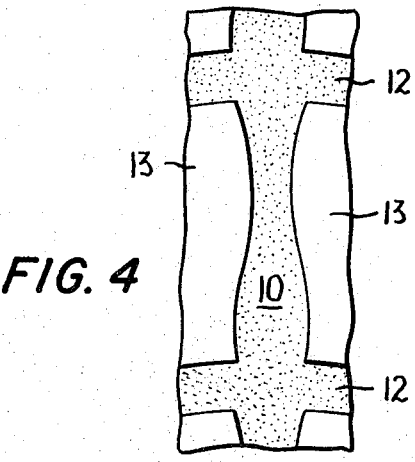
FIGS. 4 and 5 are fragmentary plan views of two of an indefinite number of tread patterns obtained in accordance with the invention.
Figure 5:
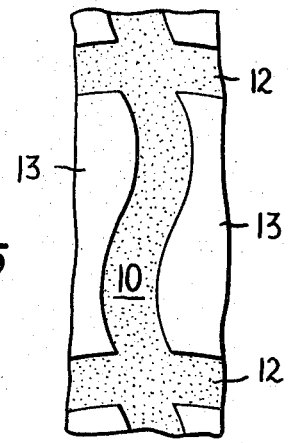

It is possible to give the grooves 10 and 11 a wavy or zig-zag shape, or also varying width by using bands 7, 8 and 9 having varying cross sections. FIGS. 4 and 5 show but two of an indefinite number of different patterns that can be realized.

Figure 3:
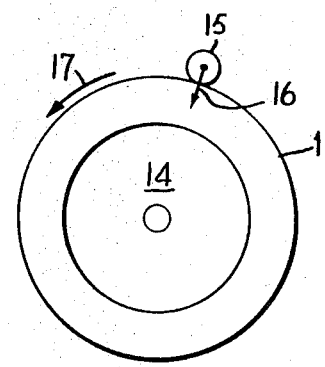
FIG. 3 is a schematic elevation of the rolling on of the bands in accordance with the invention.

Positioning of the bands 7, 8 and 9 is undertaken mechanically by placing the carcass 1 on a rotating support 14 (FIG. 3) and rolling the bands all around the carcass. The fixing by roller of the bands may likewise be carried out mechanically, for example, with the help of a roller 15 which presses each band against the carcass 1 as shown by an arrow 16 while the carcass 1 is rotated as shown by an arrow 17. The roller 15 exerts a pressure of at least .5 kg./cm.$^2$ and may be biased by any of a number of means including a spring. While the cover 1 is shown as rotated, the important requirement is relative rotation, and the roller 15 may be revolved about the tire, or some combination of the two movements may be employed.

Thus there is provided in accordance with the invention a novel and highly effective method of retreading a tire and a durable and desired retreaded tire produced by the method. Many modifications of the disclosed representative embodiments within the spirit and scope of the invention will occur to those skilled in the art. Accordingly, the invention is to be construed as including all the modifications thereof within the scope of the appended claims.

I claim:

1. A method of retreading a tire comprising the steps of mounting a tire carcass, positioning a plurality of bands of unvulcanized rubber tread material circumferentially of said carcass, bringing opposite ends of said bands substantially together to form rings, said rings being at axially different locations on said carcass, subjecting said bands to a circumferential rolling under a uniform pressure of at least .5 kg./cm.$^2$, positioning masking means between adjacent bands to seal off portions of said carcass between said bands, and vulcanizing the assembly, whereby said bands form a new tread for said tire.

2. A method according to claim 1 wherein said carcass is mounted rotatably, further comprising the step of rotating said carcass during the positioning of said bands and masking means to facilitate said positioning, and wherein said circumferential rolling is effected by rotating said carcass.

3. A method according to claim 1 comprising the steps of forming transverse grooves in said bands before said positioning of said bands and curing said bands after said positioning of said bands.

4. A method according to claim 1 comprising the steps of forming transverse grooves in said bands after said positioning of said bands and curing said bands after said positioning of said bands.

5. A method according to claim 1 comprising the steps of forming at least one of said bands with a first transverse profile and forming at least one other of said bands with a different transverse profile.

6. A method according to claim 1 comprising the steps of varying the separation between adjacent bands as a function of circumferential position on said carcass.

7. A method according to claim 1 comprising the steps of forming and positioning said bands so that there are defined between them grooves of wavy shape in a circumferential direction.

8. A method according to claim 1 comprising the step of forming said bands in a thickness that is variable.

9. A method according to claim 1 comprising the step of forming transverse grooves in said bands after said positioning of said bands on said carcass and subjecting of said bands to said circumferential rolling and before said positioning of said masking means between adjacent bands and said vulcanizing of the assembly.

References Cited

UNITED STATES PATENTS

| | | | |
|---|---|---|---|
| 2,180,650 | 11/1939 | White | 156—128 |
| 2,345,518 | 3/1944 | Wendel | 156—129 |
| 2,609,026 | 9/1952 | Luchsinger-Caballero | 156—96 |
| 3,283,795 | 11/1966 | Schelkmann | 156—96 |
| 3,464,874 | 9/1969 | Ragen | 156—96 |

BENJAMIN A. BORCHELT, Primary Examiner

D. A. HART, Assistant Examiner

U.S. Cl. X.R.

156—94